Nov. 29, 1960 — B. NORRIS ET AL — 2,961,960
TORPEDO EXPLODER MECHANISM
Filed July 20, 1949 — 6 Sheets-Sheet 1

Inventors
Bob Norris
J. M. Kendall

Attorney

Nov. 29, 1960

B. NORRIS ET AL

2,961,960

TORPEDO EXPLODER MECHANISM

Filed July 20, 1949

Inventors
Bob Norris
J.M. Kendall

By M.A.Hayes

Attorney

Nov. 29, 1960    B. NORRIS ET AL    2,961,960
TORPEDO EXPLODER MECHANISM
Filed July 20, 1949    6 Sheets-Sheet 4

Inventors
Bob Norris
J.M. Kendall
M.Q.Hayes
Attorney

Nov. 29, 1960

B. NORRIS ET AL 2,961,960

TORPEDO EXPLODER MECHANISM

Filed July 20, 1949

Inventors
Bob Norris
J. M. Kendall

By

Attorney

Nov. 29, 1960  B. NORRIS ET AL  2,961,960
TORPEDO EXPLODER MECHANISM
Filed July 20, 1949  6 Sheets-Sheet 6

Inventors
Bob Norris
J.M. Kendall

Attorney

United States Patent Office 2,961,960
Patented Nov. 29, 1960

2,961,960

TORPEDO EXPLODER MECHANISM

Bob Norris, 549 Scott St., Auburn, Ala., and James M. Kendall, 5309 Pard Road, Coral Hills, Md.

Filed July 20, 1949, Ser. No. 105,856

8 Claims. (Cl. 102—17)

(Granted under Title 35, U.S. Code (1952), sec. 266)

This invention relates generally to an exploder mechanism for a torpedo and more particularly to an exploder mechanism for an electrically propelled "homing" type torpedo which is adapted to be launched from an aircraft in flight and to destroy a submarine below the surface of the water.

A homing type torpedo is known in marine warfare as one which is provided with a steering device which is responsive to some characteristic of the target vessel such, for example, as microphones which are responsive to the disturbances transmitted through the surrounding water by the propellers of the submarine and which employs means controlled by the microphones for steering the torpedo to the submarine. A steering device adapted to accomplish the foregoing steering operations is described and illustrated in U.S. Patent No. 1,121,563, issued to Karl O. Leon for Automatic Steering Apparatus.

In certain exploder mechanisms heretofore devised for use in torpedoes, an impeller wheel and associated gear reduction are employed as the motive means for driving the arming device for the exploder mechanism whereby the firing circuit of the mechanism does not become effective to fire the torpedo until the torpedo leaves the launching craft and moves through the water a predetermined distance. Such an arrangement is described and claimed in the copending application of James M. Kendall et al., Serial No. 750,615 for Torpedo Exploder Mechanism.

This arrangement has not been found to be entirely satisfactory for use with homing type torpedoes for the reason that the impeller drive mechanism is noisy in operation and produces acoustical disturbances in the surrounding water which interfere with the intended operation of the steering apparatus in response to the sound signals received from the submarine. Moreover, in other torpedo exploders heretofore employed with torpedoes launched from an aircraft in flight, and wherein an impeller wheel arming mechanism is used, the impact of the torpedo with the surface of the water may damage the impeller mechanism sufficiently to result in failure of the arming means to operate whereupon the firing circuit becomes ineffective to fire the torpedo.

Furthermore, certain of the prior art torpedo exploders possess the disadvantage of prematurely detonating in the event that the torpedo crashes on the deck of a vessel or in the event the plane carrying the torpedo crashes on the surface of the water by reason of the actuation of the impact responsive mechanism employed thereby.

In accordance with the arrangement of the present invention, the torpedo exploder retains all of the advantages of the prior exploder mechanisms of this general type and possesses none of the foregoing disadvantages.

More specifically, the invention provides an electrically operated arrangement in which a certain portion of the explosive train of the exploder mechanism is held out of firing relation with respect to the detonator and booster charge until the torpedo has left the launching craft and remained a predetermined interval below a predetermined depth of submergence, the explosive train portion being moved to close the explosive train at the termination of the predetermined interval by an electric motor acting through a gear train. At the time the explosive train moves into proper firing relation, a switch in the firing circuit is closed to partially arm the firing circuit which becomes fully armed only when the torpedo is submerged to a second predetermined depth exceeding the first predetermined depth. When the firing circuit is fully armed, it is rendered effective by an inertia switch to fire the detonator in response to the shock of impact of the torpedo with a target vessel when the torpedo is submerged at a depth exceeding the second predetermined depth but not exceeding a third predetermined depth of submergence at the time of impact.

Should the torpedo miss the target submarine and sink to the third predetermined depth which may be a great depth such, for example, as 500 feet, a pressure responsive switch renders the firing circuit ineffective to fire the detonator as the inertia switch operates in response to the impact of the torpedo with the bed of the body of water or in response to the shock resulting from collapse of the torpedo casing by great water pressure.

One of the objects of the present invention is to provide a new and improved torpedo exploder mechanism which remains unarmed and ineffective to fire the torpedo until it has left the launching aircraft.

Another object of the invention is to provide an exploder mechanism which will become armed a predetermined interval after the torpedo has sunk to and remains below a predetermined depth of submergence.

Another object resides in the provision of a torpedo exploder mechanism effective to fire the torpedo in response to impact thereof with a target vessel submerged below a first predetermined depth and above a second predetermined depth of submergence.

An additional object of the present invention resides in the provision of an exploder mechanism which is ineffective to fire the torpedo in response to the impact thereof with a surface vessel.

Still an additional object of the present invention is to provide an exploder mechanism which is ineffective to fire the torpedo in response to the impact thereof with the bed of a body of water or in response to the shock resulting from the collapse of the torpedo casing due to great water pressure when the torpedo misses a target submarine and sinks below a predetermined depth of submergence.

A further object of the invention resides in a new and improved torpedo exploder arming arrangement having provision for maintaining the elements of an explosive train out of proper firing relation with respect to the detonator until the torpedo has remained a predetermined interval of time below a predetermined depth of submergence.

A still further object of the present invention is to provide a new and improved arming arrangement for connecting the firing circuit of a torpedo exploder to an electrical source a predetermined interval after the torpedo has sunk below a predetermined depth of submergence which does not transmit acoustical disturbances within the surrounding water and therefore does not interfere with the sound responsive homing type steering mechanism of the torpedo.

Other objects and many of the attendant advantages of this invention will be readily appreciated as the same becomes better understood by reference to the following detailed description when considered in connection with the accompanying drawings wherein:

Figure 1:
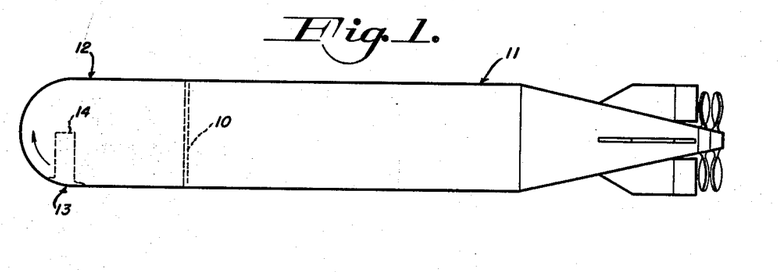
Fig. 1 is a view in elevation of the torpedo showing the exploder mechanism mounted within the handhole of the torpedo.
Figure 2:
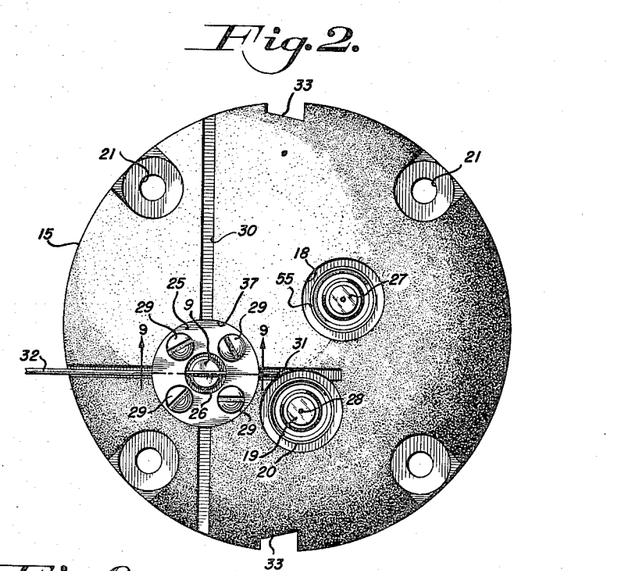
Fig. 2 is a plan view of the base of the exploder mechanism.

Referring now to the drawings and more particularly to Fig. 1 there is shown thereon a torpedo generally designated as 11 and having an exploder mechanism 13 mounted in a handhole 14 provided in the warhead 12 of the torpedo. A bulkhead 10 separates the warhead 12, containing the main explosive charge, from the rear compartments of the torpedo which contain the propulsion and steering mechanisms (not illustrated) for operating the torpedo electrically from a power source comprising storage batteries BA, Fig. 13.

The exploder mechanism 13 is secured within the handhole 14 in watertight relation therewith by means of screws (not shown) disposed within bores 21 which extend through the base 15. Tightening of these screws forces shoulder 34 formed on base 15 against the flange of the handhole, a ring gasket 36 being compressed between the shoulder 34 and the flange of the handhole to form a watertight seal therebetween.

Base 15 has a pair of threaded bores 55 and 20 therethrough into which are mounted in watertight relation therewith hydrostatic switches 18 and 19 which are adapted to close an electric circuit at 50 feet and 15 feet of water pressure respectively. Switches 18 and 19 form elements of the firing and arming circuits respectively and control operation thereof in the manner hereinafter more fully to be explained, as the switches close in response to the hydrostatic pressure on the outer surface of the torpedo.

Figure 9:
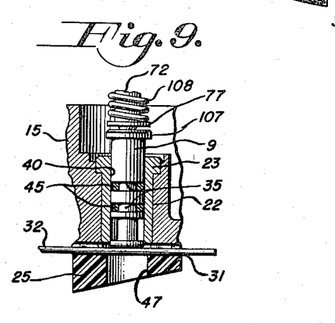
Fig. 9 is a sectional view taken along line 9—9 of Fig. 2.
Figure 10:
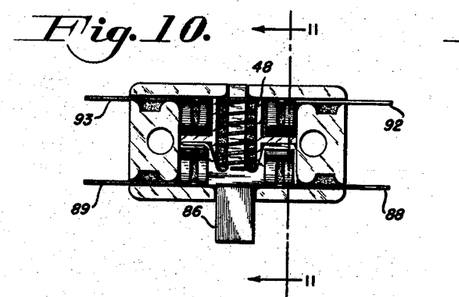
Fig. 10 is a plan view of the arming switch with the top casing removed.
Figure 11:
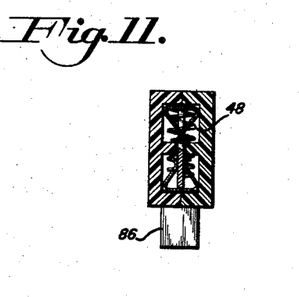
Fig. 11 is a sectional view taken along line 11—11 of Fig. 10.

As may best be seen in Fig. 9, base 15 is provided with bore 22 therethrough into which is pressed flanged bushing 23 having an axial bore 40 therethrough into which is slidably arranged rod 9 having a flanged portion 107 formed thereon.

A pair of ring gaskets 45 sleeved about rod 9 and interposed within circumferential grooves 35 formed in the rod, provide a watertight seal between the rod and the bushing 23. Collar 25 having an axial bore 47 therethrough in registry with bore 40 is fitted within recess 37 formed in base 15 and is secured thereto by machine screws 29. Rod 9 is slidably arranged within axial bore 47 through collar 25. A pair of intersecting grooves 30 and 31 are formed in base 15 to receive safety wire 32 which is adapted to be threaded between the collar 25 and base 15 to depress the rod 9 within bushing 23 prior to launching the torpedo from an aircraft, as will hereinafter more fully be described. A pair of diametrically disposed notches 33 are cut within base 15 to provide space for inserting a suitable tool between the base 15 and handhole for extracting the exploder 13 from the handhole 14. Under certain launching conditions it is preferable to insert wire 32 in groove 30 instead of in groove 31, as illustrated.

Figure 3:
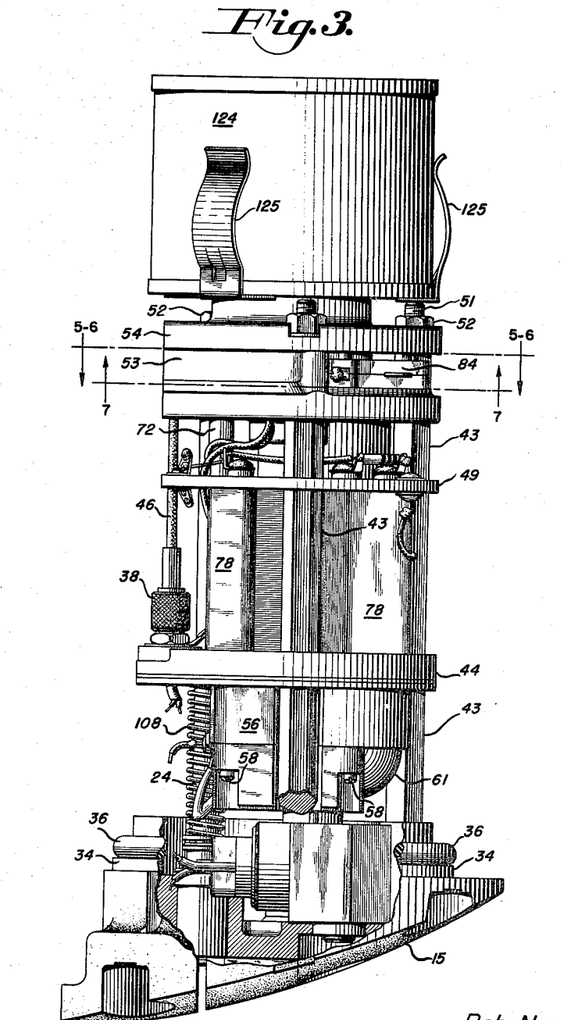
Fig. 3 is a view partly in elevation and partly in section of the exploder mechanism.
Figure 4:
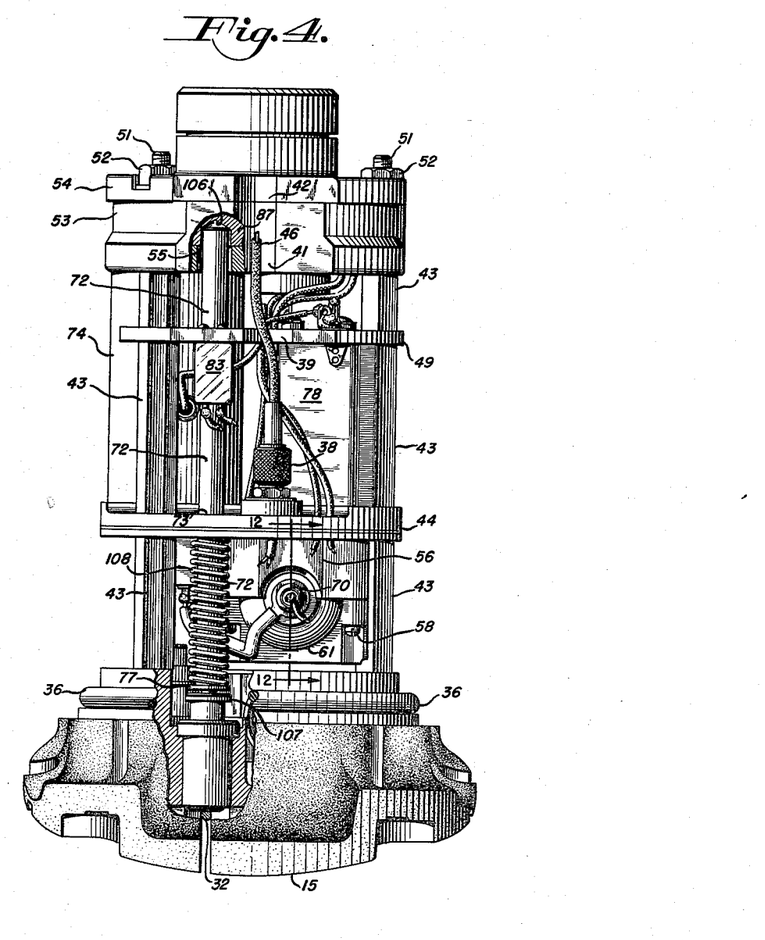
Fig. 4 is a view partly in elevation and partly in section of the exploder mechanism rotated 180 degrees from the view shown in Fig. 3 with the booster cup and its clamps removed.

Referring now more particularly to Figs. 3 and 4, there is shown thereon three spacer rods 43 for securing in parallel spaced relation, lower condenser support 44, upper condenser support 49 and gear plate 53 to base 15. The ends of spacer rods 43, extending through matching bores through top plate 54, carry a threaded extension 51 for receiving nuts 52 to provide for clamping top plate 54 to gear plate 53 as the nuts are tightened.

Lower condenser support 44 has a conventional electrical connector 38 which serves as a terminal for a cable 46 to interconnect various electrical elements of the exploder mechanism with the batteries BA located in the rear compartment of the torpedo. Upper condenser support 49, gear plate 53 and top plate 54 are notched at 39, 41, and 42 respectively to receive the battery cable 46 therein.

Figure 12:
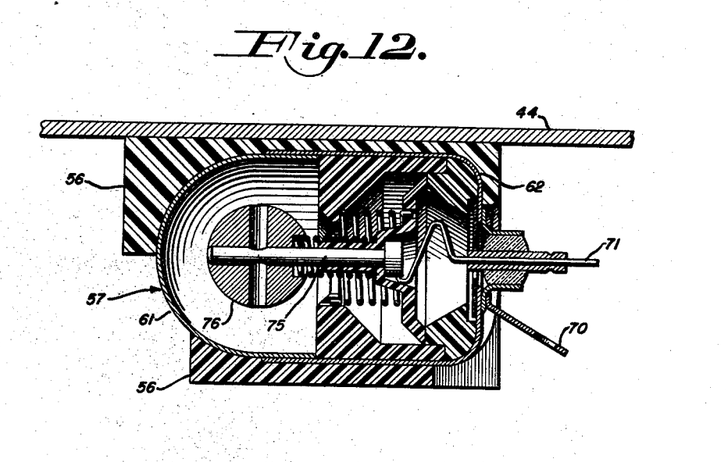
Fig. 12 is a sectional view of the inertia switch employed in the exploder mechanism.

The exploder mechanism also includes an inertia switch 57, the details of which are shown in Fig. 12, which is adapted to close the firing circuit of the exploder in response to the impact of the torpedo with a target vessel. The switch 57 is encased within a chamber formed within a pair of insulating support members 56 which are secured to condenser support 44 by screws 58.

The inertia switch is similar to the one disclosed and described in the copending application of James M. Kendall, et al., filed October 17, 1947, Serial No. 780,562.

The inertia switch 57 comprises a pair of electroconducting hemispherical and cylindrical portions 61 and 62 respectively which are telescopingly arranged and secured together with a switch terminal 70 soldered to portion 62.

The switch 57 is mounted on condenser support 44 with the axis of the stem 75 arranged parallel to the longitudinal axis of the torpedo and with the inertia weight 76 secured to the end of the stem and extending toward the nose of the torpedo.

When the torpedo strikes a target vessel, the inertia weight 76 moves into engagement with end portion 61 to complete an electric circuit between conductor 71 and terminal 70.

A pair of condensers 78 (Figs. 3 and 4) are disposed within matching pairs of recesses (not shown) formed within upper and lower condenser supports 49 and 44 respectively.

Figure 7:
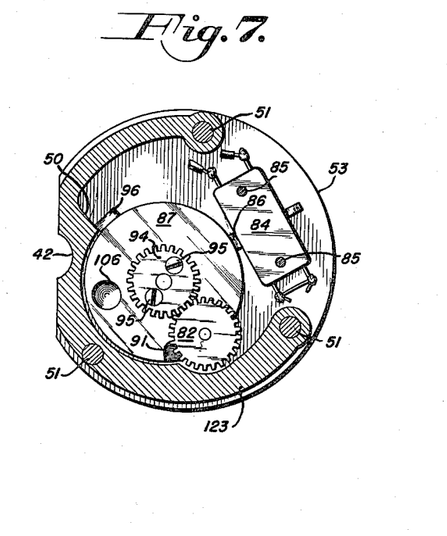
Fig. 7 is a view taken along line 7—7 of Fig. 3 with various parts of the exploder mechanism in the unarmed position.

A motor M and its associated reduction gears R enclosed within the watertight casing 79, is disposed within the recess provided therefor in lower condenser support 44 and is held in a registering recess 81, Fig. 7, in gear plate 53.

Figure 13:
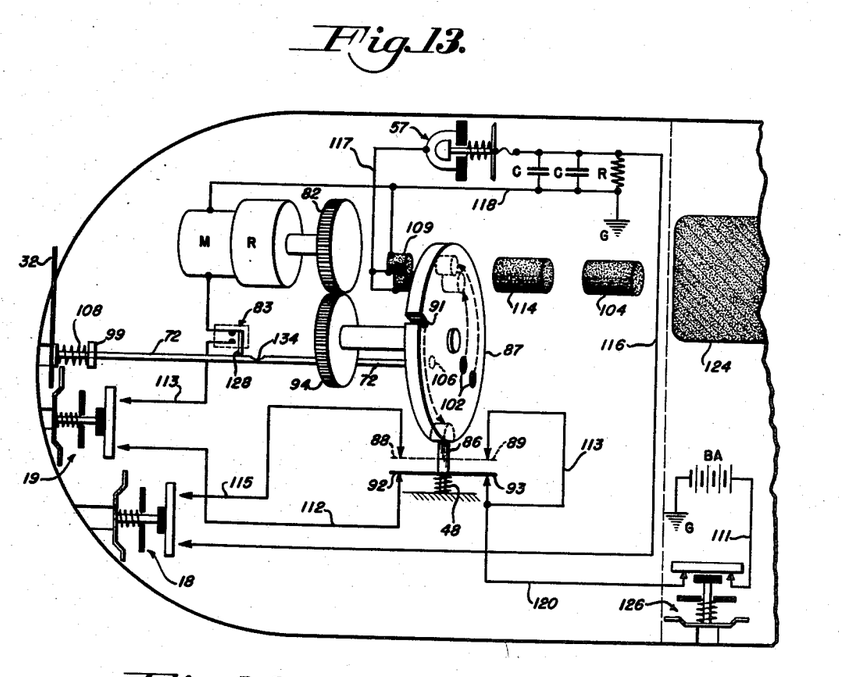
Fig. 13 illustrates diagrammatically the electrical circuit for the arming and firing system of the exploder mechanism.

Reduction gears R form a part of the gear train driven by motor M, Fig. 13, to drive rotor 87. The rotor is mounted in face adjacency with the gear plate 53 and gears 82 and 94 are arranged in recesses therefor in the gear plate 53. Gear plate 53 is also provided with a pair of bores 108 into which are pressed a pair of electro-responsive squibs or detonators 109.

Referring now more particularly to Figs. 5 through 7, 10, and 11, there is shown thereon the arming switch 84 rigidly secured to gear plate 53 by screws 85. The switch 84 is so constructed and arranged that an arm 86 is yieldably urged into engagement with the periphery of the disc-shaped rotor 87 by compression spring 48. When arm 86 is in engagement with the rim of rotor 87, the switch forms an electrical connection between terminals 92 and 93. When the rotor 87 is rotated until notch 91, cut into the periphery of the rotor, is moved into registry with arm 86, the arm moves into the notch and switch 84 electrically connects terminals 88 and 89.

Figure 5:
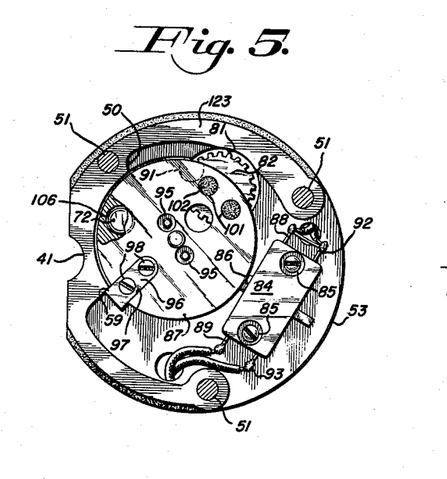
Fig. 5 is a view taken along line 5—5 of Fig. 3 showing various parts of the exploder mechanism in the unarmed position.
Figure 6:
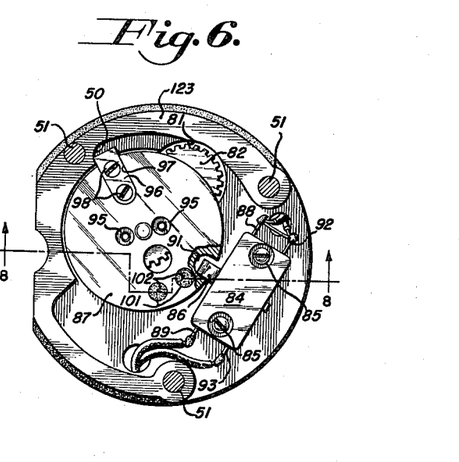
Fig. 6 is a view similar to Fig. 5 and showing various parts of the exploder mechanism in the armed position.

The rotor 87 is driven by the motor M through gearing 82 and 94, gear 94 being rigidly secured in face adjacency to the rotor by screws 95. Rotor 87 is provided with a slot 97 formed in the face thereof into which is secured stop 96 which is held therein by a pair of screws 98. The stop 96 extends outwardly of the periphery of rotor 87 and into engagement with shoulder 59 formed on gear plate 53 when the exploder is in the unarmed condition, as shown in Fig. 5. As the rotor 87 moves to the armed position, as shown in Fig. 6, stop 96 moves into engagement with shoulder 50 formed on gear plate 53 to stop further rotation of the rotor.

Rotor 87 has a pair of parallel bores 101 therethrough into which is pressed an explosive mixture 102 which forms an element of a movable explosive train, as will hereinafter be more fully described. A recess 106, Figs. 5 and 7, within the face of rotor 87 is provided to receive the end of a safety rod 72 therein which secures the rotor when in the unarmed position prior to releasing the torpedo from the aircraft, the safety rod being withdrawn from the rotor as the torpedo is launched, as will hereinafter be more fully described.

As seen in Fig. 4, safety rod 72 is slidably arranged within axial bores 73 and 74 through condenser supports 44 and 49 respectively. The rod 72 is provided with an integrally formed collar 77, which forms an abutting surface with the aforementioned flanged portion 107 of rod 9 and a seat for one end of compression spring 108.

Compression spring 108 is interposed between condenser support 44 and collar 77 and its normal tendency (except when the safety wire 32 is disposed within groove 30 and interposed between the safety collar 25 and the rod 9, prior to releasing the torpedo from the aircraft) is to withdraw the end of rod 72 from engagement with recess 106 in the rotor 87 so that the rotor will be held in the unarmed position, as shown in Fig. 5, until the torpedo has left the launching craft.

Figure 8:
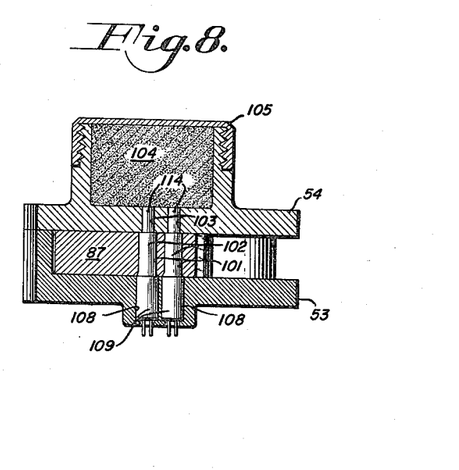
Fig. 8 is a view taken along line 8—8 of Fig. 6 showing parts of the exploder in the armed position.

Top plate 54, Fig. 8, is provided with a pair of bores 103 therethrough containing an explosive mixture 114 which forms an element of the aforementioned explosive train and abuts a booster charge 104 carried within cup member 105. The cup member 105 is threadedly secured to the plate 54, as shown. Top plate 54 is also provided with a protective skirt 123 which partially encloses and protects the rotor 87.

A second booster cup 124, disposed in explosive relation to the explosive mixture 104, is secured to top plate 54 by booster clamps 125 as shown in Fig. 3.

Secured in watertight relation to the side wall of the torpedo is a conventional hydrostatic switch 126 which is connected in series with the firing circuit of the exploder mechanism, as best shown in Fig. 13. Switch 126 is adjusted and arranged to disconnect the firing circuit from the battery BA when the torpedo misses the target vessel and sinks below 500 feet in order to prevent the exploder from firing the torpedo in response to the impact thereof with the bed of the water or in response to the shock resulting from collapse of the torpedo casing by excessive water pressure.

Figure 14:
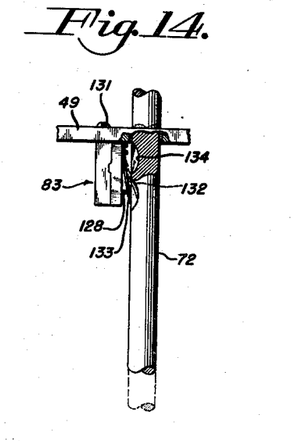
Fig. 14 is a fragmentary view of a switch arrangement for partially closing the arming circuit as the torpedo falls away from the launching aircraft.

Referring now more particularly to Figs. 4, 13 and 14, there is shown thereon a conventional button switch 83 which is secured to upper condenser support 49 by screws 131. Switch 83 is provided with an actuating button 128 which is springed urged into engagement with rod 72 to open switch 83 as the rod is initially depressed to engage recess 106 in the rotor 87 and the safety wire 32 is threaded through groove 31. Rod 72 is provided with a cam surface 134 which moves into registry with the button 128 thereby to close switch 83 when the wire 32 is withdrawn from groove 31 as the torpedo leaves the launching craft, rod 72 being moved under power of spring 108. The switch 83 is connected in conductor 113 to connect the pressure switch 19 to the motor M as the torpedo is launched.

The operation of the exploder mechanism will best be understood by reference to Fig. 13 wherein the complete electrical system of the exploder mechanism is diagrammatically illustrated.

The torpedo is prepared for launching from an aircraft in flight to attack a target submarine below the surface of the water by positioning the rotor 87 as shown in Fig. 5, with safety wire 32 threaded through groove 30 and beneath safety rod collar 25 which thus depresses the safety rod 72 and moves the end of the rod into engagement with recess 106, to prevent the rotor 87 from moving from the unarmed position until the safety rod is withdrawn. The free end of safety wire 32 is then attached to a part of the aircraft structure.

As the torpedo is released from the aircraft, safety wire 32 is withdrawn from collar 25 and groove 30 and spring 108 operates to move safety rod 72 out of detent 106 to free the rotor 87 and to close switch 83 thereby to connect switch 19 to motor M. As aforedescribed, the torpedo is adapted to destroy enemy submarines, the steering mechanism being suitably constructed and arranged to guide the torpedo below the surface of the water and in the direction of the target submarine.

It will be apparent that when the torpedo reaches a depth of 15 feet, hydrostatic switch 19 closes to complete an electrical circuit from the batteries BA in the rear compartment of the torpedo by way of conductor 111 through normally closed hydrostatic switch 126, through conductor 120, through switch 84 by way of terminals 93 and 92, through conductor 112, through the hydrostatic switch 19, by way of conductor 113 and switch 83, and thence through motor M to ground potential on conductor 118 and on the other side of battery BA.

The motor operates to drive gears 82 and 94 to cause rotor 87 to rotate in the direction indicated by the arrows. After a predetermined lapse of time, the notch 91 in the rotor moves into registry with arm 86 to cause the arm to move into the notch, whereby the switch 84 disconnects terminals 92 and 93 and simultaneously connects terminals 88 and 89. The circuit from the batteries BA to the motor M is thus disconnected to stop the motor. During the foregoing operation of the motor, the rotor 87 has moved the explosive mixture 102 from a non-firing position into proper firing relation with the explosive train comprising detonators 109, explosive mixture 114, explosive mixture within booster cup 104, and the explosive charge contained within the booster cup 124.

The arming operation has now been completed.

In order to protect surface vessels from the torpedo, normally open hydrostatic switch 18 is provided in the firing circuit to render the circuit ineffective to fire the detonator until the switch closes the circuit when the torpedo has sunk 50 feet below the surface.

When switch 18 closes, a circuit is completed for charging the parallel connected condensers C from battery BA by way of conductor 111, switch 126, conductors 120 and 113, contacts 89 and 88 of switch 84, conductor 115, switch 18, and thence by way of conductor 116 to the condensers which are connected on the other side to ground.

When the torpedo is below 50 feet and strikes a target submarine, inertia switch 57 is closed thereby to discharge condensers C through the firing circuit for the detonators 109 from the condensers C through switch 57, conductor 117, through electroresponsive detonators 109, and thence by way of conductor 118 to ground at the other side of the condensers. The detonation of the electroresponsive detonator 109 causes sequential firing of the detonating mixtures 102, 114, the sub booster charge 104, the main booster charge within cup 124 to detonate the war head of the torpedo.

Should the torpedo rise above a depth of 50 feet, hydrostatic switch 18 will again open the circuit to render the firing circuit ineffective to fire the torpedo so as to protect surface vessels against the torpedo, the resistor R serving to discharge the condensers.

Should the torpedo miss the target submarine and sink to a great depth such, for example, as 500 feet, hydrostatic switch 126 operates to disconnect the firing circuit from batteries BA to render the firing circuit ineffectual to fire the torpedo as the inertia switch 57 operates in response to the impact of the torpedo with the bed of the body of water or when the torpedo casing is crushed by excessive water pressure.

Obviously many modifications and variations of the present invention are possible in the light of the above teachings. It is therefore to be understood that within the scope of the appended claims the invention may be practiced otherwise than as specifically described.

The invention described herein may be manufactured and used by and for the Government of the United States of America for governmental purposes without the payment of any royalties thereon or therefor.

What is claimed as new and desired to be secured by letters Patent of the United States is:

1. In a torpedo exploder mechanism of the character disclosed, the combination of a firing circuit including an electroresponsive detonator, time delay means for partially arming the firing circuit in predetermined time delayed relation to the initiation of the operation of the time delay means, a first pressure responsive means in communication with the surrounding water for initiating operation of said time delay means when the torpedo reaches a first predetermined depth of submergence, a second pressure responsive means for fully arming the firing circuit when the torpedo reaches and remains below a second predetermined depth of submergence, and inertia means effective when the firing circuit is fully armed for rendering the firing circuit effective to fire the detonator as the inertia means operates in response to the impact of the torpedo with a submarine target vessel.

2. In a torpedo exploder mechanism of the character disclosed, the combination of an electroresponsive detonator, a hydrostatic switch constructed and arranged to be closed when the torpedo reaches a predetermined depth of submergence, an energy storage device, a circuit including said switch for supplying energy to said device as the switch closes, a circuit including an inertia responsive switch for causing the detonator to be fired by the energy in said storage device as the inertia switch operates in response to the impact of the torpedo with its target, and circuit means for discharging the energy from the storage device as said switch opens when the depth of submergence of the torpedo becomes less than said predetermined value.

3. In a torpedo exploder mechanism of the character disclosed, the combination of an electroresponsive detonator, an energy storage device, a circuit including a normally open pressure responsive switch adapted to store energy in said storage device as the switch closes when the pressure of the surrounding water on the surface of the torpedo is increased above a predetermined value, means adapted to be rendered effective when the pressure on the torpedo is decreased below said predetermined value to discharge the energy stored in the storage device, and a circuit including an inertia responsive switch for causing the detonator to be fired by the energy in said storage device as the inertia switch operates in response to the impact of the torpedo with a target at or below a depth of submergence corresponding to said predetermined pressure.

4. In a torpedo exploder mechanism of the character disclosed, the combination of a firing circuit including an electroresponsive detonator, time delay means for arming the firing circuit in predetermined time delayed relation to the initiation of the operation of the time delay means, a first pressure responsive device for initiating operation of the time delay means when the pressure of the water surrounding the torpedo reaches a first predetermined value, means including a second pressure responsive device for rendering the firing circuit ineffective to fire the detonator when the pressure of the water surrounding the torpedo is less than a second predetermined value, and inertia switch means effective when the firing circuit is armed to close the firing circuit thereby to fire the detonator as the inertia switch means operates in response to the impact of the torpedo with its target.

5. An exploder mechanism for an aerially launched torpedo comprising, in combination, an explosive train including an electroresponsive detonator and a movable explosive element initially positioned out of operative firing relation with respect to the detonator, a source of energy, a double pole double throw arming switch having a safe position and an armed position, a first hydrostatic switch adapted to be closed when the pressure of the surrounding water reaches a first predetermined value, a motor, a circuit including said arming switch and said hydrostatic switch for operating said motor from said source of energy when the arming switch is in the safe position thereof and as the first hydrostatic switch closes, means including said motor for simultaneously moving said explosive element into said operative firing relation and moving said double pole double throw switch to the armed position thereof thereby to open said operating circuit for the motor when the motor has made a predetermined number of revolutions, an energy storage device, a second hydrostatic switch adapted to be closed when the pressure of the surrounding water reaches a second predetermined value, a circuit including said arming switch and said second hydrostatic switch for storing energy in said storage device from said energy source when the arming switch is in the armed position thereof and as said second hydrostatic switch closes, an inertia responsive switch, and a firing circuit for said detonator including said inertia responsive switch arranged to fire the detonator by the energy discharged therethrough from said energy storage device as said inertia switch closes in response to impact of the torpedo with a submarine target.

6. An exploder mechanism for an aerially launched torpedo comprising, in combination, an explosive train including an electroresponsive detonator and a moveable explosive element initially positioned out of operative firing relation with respect to the detonator, a source of energy, a double pole double throw arming switch having a safe position and an armed position, a first hydrostatic switch adapted to be closed when the pressure of the surrounding water reaches a first predetermined value, a motor, a circuit including said arming switch and said hydrostatic switch for operating said motor from said source of energy when the arming switch is in the safe position thereof and as the first hydrostatic switch closes, means including said motor for simultaneously moving said explosive element into said operative firing relation and moving said double pole double throw switch to the armed position thereof thereby to open said operating circuit for the motor when the motor has made a predetermined number of revolutions, a condenser, a second hydrostatic switch adapted to be closed when the pressure of the surrounding water reaches a second predetermined value, a circuit including said arming switch and said second hydrostatic switch for charging said condenser from said energy source when the arming switch is in the armed position thereof and as said second hydrostatic switch closes, an inertia responsive switch, a firing circuit for said detonator including said inertia responsive switch arranged to fire the detonator by the energy discharged therethrough from said condenser as said inertia switch closes in response to impact of the torpedo with a submarine target, a resistor shunted across said condenser, and a third normally closed hydrostatic switch in said condenser charging circuit and adapted to be opened when the pressure of the surrounding water reaches a third predetermined value, the energy in said condenser being discharged through said resistor as said second and third hydrostatic switches open thereby to render said firing circuit ineffective to fire the detonator.

7. In a torpedo exploder mechanism of the character disclosed, the combination of an electroresponsive detonator, an energy storage device, a source of electrical energy, means for storing energy in said device from said source, means for discharging said energy through the detonator upon impact of the torpedo with a vessel below a predetermined depth of submergence, and means for preventing discharge of said energy through the detonator upon impact of the torpedo with a vessel above said predetermined depth of submergence, said first named means comprising a normally open pressure responsive switch in communication with the surrounding water and adapted to be closed to connect said source to said device in response to a predetermined amount of pressure on the surface of the torpedo corresponding to said predetermined depth of submergence, and said last named means comprising a resistor shunted across said device for discharging said energy therethrough as said pressure switch opens.

8. In a torpedo exploder mechanism of the character disclosed, the combination of an electroresponsive detonator, an electrical energy storage device, means for storing electrical energy in said storage device, circuit means including an inertia responsive switch for causing the detonator to be fired by energy from said storage device upon impact of the torpedo with a target below a predetermined depth of submergence, said first named means comprising a normally open pressure responsive switch in communication with the surrounding water and adapted to be closed to initiate operation of said storing means in response to a pressure of predetermined value on the surface of the torpedo corresponding to said predetermined depth, and means short circuiting the energy storage device and effective to discharge said energy therethrough as said pressure switch opens.

References Cited in the file of this patent
UNITED STATES PATENTS

| | | |
|---|---|---|
| 1,892,431 | Hammond | Dec. 27, 1932 |
| 2,419,815 | Breeze et al. | Apr. 29, 1947 |